United States Patent [19]

Corrigan et al.

[11] Patent Number: 5,193,168

[45] Date of Patent: Mar. 9, 1993

[54] MULTIPROCESSING SYSTEM WITH ENHANCED SHARED STORAGE

[75] Inventors: Michael J. Corrigan, Rochester; Harris L. Freeman, Kasson; George G. Gorbatenko, Rochester, all of Minn.

[73] Assignee: International Business Machines Corporation, Armonk, N.Y.

[21] Appl. No.: 754,339

[22] Filed: Sep. 4, 1991

Related U.S. Application Data

[63] Continuation of Ser. No. 265,114, Oct. 31, 1988, abandoned.

[51] Int. Cl.⁵ .............................................. G06F 12/00
[52] U.S. Cl. ............................ 395/425; 364/DIG. 1; 364/228.; 364/246.6; 364/281.6
[58] Field of Search ...................... 364/228.1; 395/425

[56] References Cited

U.S. PATENT DOCUMENTS

| | | | |
|---|---|---|---|
| 3,771,146 | 11/1973 | Cotton et al. | 364/200 |
| 3,787,813 | 1/1974 | Cole et al. | 364/200 |
| 3,787,818 | 1/1974 | Arnold et al. | 340/172.5 |
| 4,000,487 | 12/1976 | Patterson et al. | 340/172.5 |
| 4,038,645 | 7/1977 | Birney et al. | 364/200 |
| 4,207,609 | 6/1980 | Luiz et al. | 364/200 |
| 4,215,400 | 7/1980 | Denko | 364/200 |
| 4,408,273 | 10/1983 | Pow | 364/200 |
| 4,449,181 | 5/1984 | Young et al. | 364/200 |
| 4,466,063 | 8/1984 | Segarra et al. | 364/200 |
| 4,764,865 | 8/1988 | Temple, III | 364/200 |
| 4,941,175 | 6/1990 | Enescu et al. | 380/4 |

OTHER PUBLICATIONS

IBM Technical Disclosure Bulletin, vol. 23, No. 7B, Dec.1980, pp. 3375–3377.

*Primary Examiner*—Gareth O. Small
*Assistant Examiner*—Kakali Chaki
*Attorney, Agent, or Firm*—Roy W. Truelson; Curtis G. Rose

[57] ABSTRACT

One processor of a multiprocessor or distributed system is designated as the owner of the shared storage. The remaining processors of the multiprocessor system are designated as requestor processors. The shared storage, typically several disk drive units, are connected to a storage controller. The storage controller is connected to all of the processors via a communications bus. The shared storage is dynamically segmented into containers of storage space. A container can vary in size and even can be split up among more than one disk drive unit. A container located on one disk drive unit can also be duplicated, or mirrored, on a different disk drive unit. The owner processor maintains a container map in its dedicated non-volatile storage. The container map contains fields that keep track of the physical location of a container, a use count, a key, and container attributes.

14 Claims, 4 Drawing Sheets

FIGURE 1

|  | 41<br>ID | 42<br>Location | 43<br>Use Ct | 45<br>Attributes | 44<br>Key |
|---|---|---|---|---|---|
| 51 | A1 | 0000-1999 | xxxx | xxxxxx | |
| 52 | A2A | 4500-4999 | xxxx | xxxxxx | |
| 53 | A2B | 5000-5499 | xxxx | xxxxxx | |
| 54 | A3 | 2000-2199 | xxxx | xxxxxx | |
| 55 | A3M | 6000-6199 | xxxx | xxxxxx | |
|  |  |  |  |  |  |
|  |  |  |  |  |  |

Figure 2A - Container Map After Create

|  | 41<br>ID | 42<br>Location | 43<br>Use Ct | 45<br>Attributes | 44<br>Key |
|---|---|---|---|---|---|
| 51 | A1 | 0000-1999 | xxxx | xxxxxx | 34164438 |
| 52 | A2A | 4500-4999 | xxxx | xxxxxx | 45134529 |
| 53 | A2B | 5000-5499 | xxxx | xxxxxx | 45134529 |
| 54 | A3 | 2000-2199 | xxxx | xxxxxx | 67134870 |
| 55 | A3M | 6000-6199 | xxxx | xxxxxx | 67134870 |
|  |  |  |  |  |  |
|  |  |  |  |  |  |

Figure 2B - Container Map After Allocation

|  | 41<br>ID | 42<br>Location | 43<br>Use Ct | 45<br>Attributes | 44<br>Key |
|---|---|---|---|---|---|
| 51 |  |  |  |  |  |
| 52 | A2A | 4500-4999 | xxxx | xxxxxx | 45134529 |
| 53 | A2B | 5000-5499 | xxxx | xxxxxx | 45134529 |
| 54 | A3 | 2000-2199 | xxxx | xxxxxx | 67134870 |
| 55 | A3M | 6000-6199 | xxxx | xxxxxx | 67134870 |
|  |  |  |  |  |  |
|  |  |  |  |  |  |

Figure 2C - Container Map After Destroy

| REQUEST PATH | CONTROL PATH | COMMAND PATH |
|---|---|---|
| CREATE | | |
| ALLOCATE | | |
| | INSERT | |
| | | OPEN |
| | | CLOSE |
| | REMOVE | |
| DEALLOCATE | | |
| DESTROY | | |

MULTIPROCESSING SYSTEM WITH ENHANCED SHARED STORAGE

This application is a continuation of application Ser. No. 07/265,114 filed Oct. 31, 1988, abandoned.

FIELD OF THE INVENTION

This invention relates to the data processing field. More particularly, this invention is a multiprocessing computer system where several processors are able to share storage units without causing integrity problems.

BACKGROUND OF THE INVENTION

The structural organization of early computer systems was quite simple. A single central processing unit (CPU) was indisputably the brains and the boss of the system. The CPU had exclusive control of all storage, since there was no other component of the system with which to share the storage.

As computer systems became advanced, more processing power was required to perform increasingly complex functions. As an alternative to designing an increasingly powerful CPU to deliver more processing power, computer systems began to share the workload between two or more processors. These computer systems were called multiprocessor systems, or distributed systems.

A major problem with multiprocessing systems is keeping each CPU autonomous from the other CPUs in the system so that they don't destroy each other's storage space as they work on their particular task. In the past, data integrity was obtained by convention and trust among the processors. One method of achieving this autonomy is to give each CPU its own set of resources, including direct access storage. Unfortunately, this duplication of resources is costly and inefficient. Substantial savings can occur if all CPUs could share the system's direct access storage.

Direct access storage can be shared in a multiprocessing system if there is a single storage server responsible for all of the shared storage. Each CPU of the multiprocessing system must go through this storage server to access data in the shared storage. Although storage servers of the past have been able to prevent two processors from accessing the same data at the same time, they lacked the capability to solve a myriad of other data integrity problems that makes truly shared storage a risky proposition.

Another approach to shared storage in a multiprocessing system is physical partitioning of the storage space. In this approach, the storage space is divided arbitrarily among processors in the multiprocessing system for the exclusive use of each processor or set of processors. While this technique solves most data integrity problems, data is not truly available to be shared under this approach; the net effect is again a duplication of resources for each processor. In addition, partitioning on physical boundaries can be inefficient and very wasteful of space. cl SUMMARY OF THE INVENTION It is a principal object of the invention to provide a multiprocessing system where storage is truly shared among the processors efficiently and without data integrity concerns.

It is another object of the invention to allocate shared storage space dynamically based on the specific needs of each processor.

These and other objects are accomplished by the multiprocessing system with enhanced shared storage disclosed herein.

One processor of a multiprocessor or distributed system is designated as the owner of the shared storage. The remaining processors of the multiprocessor system are designated as requestor processors. The shared storage, typically several disk drive units, are connected to a storage controller. The storage controller is connected to all of the processors via a communications bus.

The shared storage is dynamically segmented into containers of storage space. A container can vary in size and even can be split up among more than one disk drive unit. A container located on one disk drive unit can also be duplicated, or mirrored, on a different disk drive unit. The owner processor maintains a container map in its dedicated non-volatile storage. The container map contains fields that keep track of the physical location of a container, a use count, a key, and container attributes.

When a requestor processor wants to create a container of storage, it sends a "Create Container" request to the owner processor over a request path of the communications bus. The Create Container request may contain the size of the container requested and other optional attributes.

The owner processor places a container entry in the container map, and physically creates a container of the shared storage for the requestor processor.

When a requestor processor wants to use a container of storage, it sends an "Allocate Container" request to the owner processor over a request path of the communications bus. The owner processor reads the entry corresponding to the requested container in the container map. If the use count stored in the container map entry is zero, indicating that this is the first request to allocate a container, the owner processor increments the use count to one and inserts a copy of this container map entry in the container table located in the storage controller. This insert operation is sent too the storage controller over the control path of the communication bus. In response to this insert operation, the storage controller randomly generates a unique key for this container and sends this key to the owner processor. The owner processor places this key in the container map entry corresponding to this container. The owner processor then sends the key to the requestor processor over the request path.

When the requestor processor needs to use the container, it sends the key along with an "Open Container" command to the storage controller over a command path of the communications bus. If this key is the same as a key in the container table, access to the container of data is granted to the requestor processor by the storage controller.

When the requesting processor no longer wishes to have the container of data opened for its use, it sends a "Close Container" request to the storage controller over the command path. A requestor processor may open and close a container several times using the key received from the owner processor in response to the Allocate Container request.

If an Allocate Container request is received by the owner processor over the request path when the use count stored in the container map entry indicates that the container has already been allocated, the use count is incremented and the key to the container is sent directly to the requestor processor. The owner processor does not need to insert a copy of the container map entry into the controller's container table, since this was done on the first Allocate Container request.

When a requestor processor decides that it no longer wishes to have a container of data allocated to it, it sends a "Deallocate Container" request to the owner processor over the request path. The owner processor checks to see if this is last requestor processor to have allocated this container by looking to see if the use count is one. If so, the use count is decremented to zero and the owner processor removes the entry in the container table located in the storage controller corresponding to this container. This "remove" operation is performed over the control path of the communications bus. If the use count is greater than one, indicating that this is not the last requestor processor to have allocated this container, the use count is decremented but the remove operation is not performed.

When the requestor processor that created a container decides that it now wants the container destroyed, it sends a "Destroy Container" request to the owner processor over the request path. After checking to make sure that the use count is zero, indicating that no processor is currently using the container, the owner processor erases the entry from the container map and optionally erases the data in the container itself, thereby destroying the container.

DESCRIPTION OF THE PREFERRED EMBODIMENT

Figure 1:
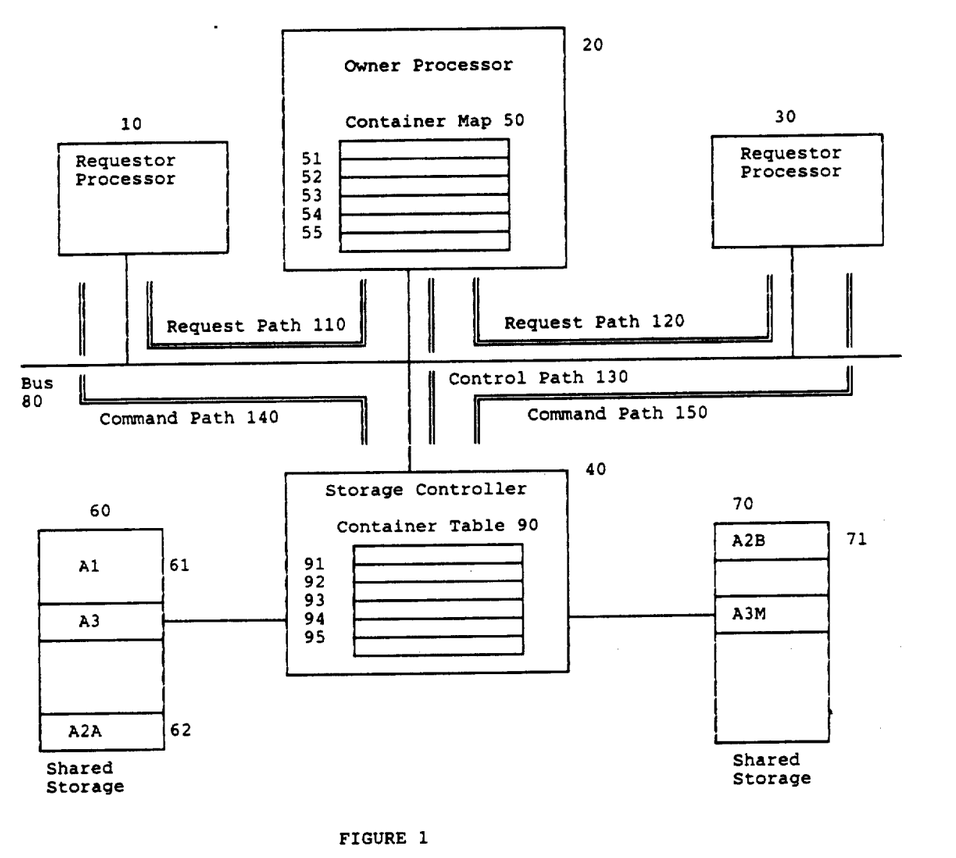
FIG. 1 shows a block diagram of the processors, storage controller, shared storage, communications bus and paths of the subject invention.

FIG. 1 shows a block diagram of the processors, storage controller, shared storage, communications bus and paths of the subject invention. Requestor processor 10, owner processor 20 and requestor processor 30 are connected together on communications bus 80. Bus 80 can be any type of connection, such as direct, remote, or part of a local area network. Bus 80 also is connected to storage controller 40. Storage controller 40 is connected to shared storage 60 and shared storage 70. In the preferred embodiment, shared storage 60 and 70 are magnetic direct access disk drives, although other types of storage, such as optical disk, etc, could also be used. Although two shared storage units are shown, anywhere from one to several units could actually be used. Owner processor 20 contains container map 50. Container map 50 is maintained in the dedicated nonvolatile storage area of owner processor 20. The contents of container map 50 are described in more detail in FIGS. 2A-2C. Storage controller 40 contains container table 90. Container table 90 is a copy of some of the information contained in container map 50, and is maintained in a high speed volatile storage area of storage controller 40.

Requests are sent from requestor processor 10 to owner processor 20 over request path 110 of bus 80. Requests are sent from requestor processor 30 to owner processor 20 over request path 120 of bus 80. Control operations are sent from owner processor 20 to storage controller 40 over control path 130 of bus 80. Commands are sent from requestor processor 10 to storage controller 40 over command path 140 of bus 80. Commands are sent from requestor processor 30 to storage controller 20 over command path 150 of bus 80.

Although two requestor processors 10 and 30 are shown in the preferred embodiment of FIG. 1, there could in practice be anywhere from one to several requestor processors. Owner processor 20 is designated as the owner of the shared storage, and thus has more control over the shared storage than the requestor processors do, as will be explained later. The designation of which processor is the owner processor can change, but only one processor may be designated as the owner processor at any one time.

Figure 2A:
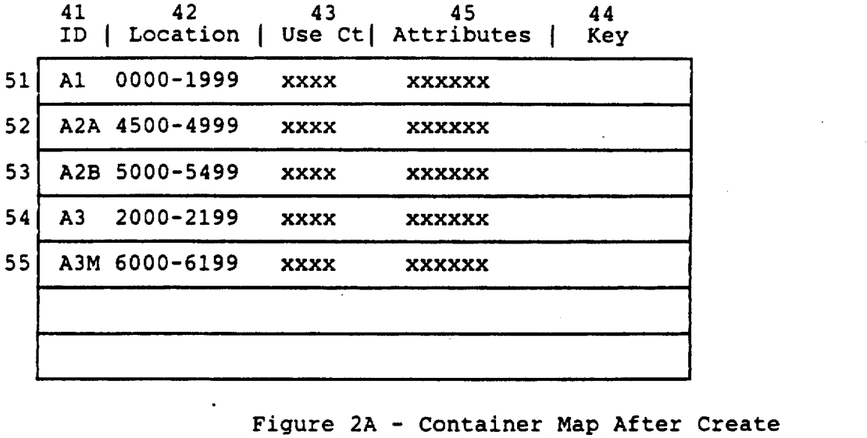
FIGS. 2A-2C show the container map of the invention.

FIGS. 1 and 2A show how containers of data are created by processors of the multiprocessing system. Referring first to FIG. 1, if requestor processor 10 wants to create a container of data, it sends a Create Container request to owner processor 20 over request path 110 of bus 80. The Create Container request in the preferred embodiment may specify the following attributes: Size of container required, if mirroring of the data is desired, if the data in the container should be erased when the container is destroyed, if space affinity is requested, if space fragmentation is permitted, and if multiple drives are permitted. Note that a Create Container request need not contain any of the above information; default values for all of the above can be assumed by the system or specified in another manner.

Let us assume that requestor processor 10 wants to create a container 2000 units in size. It sends a Create Container request over request path 110 to owner processor 20. Owner processor 20 checks the storage to verify sufficient space is available to satisfy this request and builds an entry 51 in container map 50 corresponding to this request. Note that authorization checking would normally be done on all requests sent to owner processor 20 over a request path.

A representation of container map 50 is shown in more detail in FIG. 2A. Field 41 contains the ID given to the allocated container. Field 42 contains the physical starting and ending location of the container. In this example, 5000 units of data are located on shared storage 60, and 5000 units of data are located on shared storage 70. Field 43 contains the use count of the container. The use count keeps track of how many processors have allocated a container, as will be discussed in more detail later. Field 45 contains the attributes of the container specified by the requestor processor in a Create Container request. Field 44 contains the key of the container.

FIG. 2A shows that requestor processor 10 has designated the ID of the container as A1 and this ID has been placed in field 41. Owner processor 20 has also allocated a container 61 on shared storage 60 with a starting location of 0000 and an ending location of 1999 and placed this information in field 42. The use count contained in field 43 would be zero at this time, since the container has not been allocated yet. Any attributes specified by requestor processor 10 in the Create Container request would be placed in attribute field 45. Since none were specified, default values will be presumed. Key field 44 is blank at the time of allocation and is not filled in until an Allocate Container request is received, as will be described later.

Referring again to FIG. 1, assume owner processor 20 wants to create a container 1000 units in size. Owner processor 20 is presumed to have an internal request path for Create Container requests that originate in owner processor 20. This internal request path connects the part of the processor requesting containers with the part of the processor that services such requests. Other than the internal request path, Create Container requests that originate in the owner processor are handled the same as requests that originate in a requestor processor. Owner processor 20 searches around for space on shared storage 60 and 70 and assuming neither 60 or 70 have 1000 available storage units, splits the container by putting part of it on shared storage 60 and the other part on shared storage 70. Owner processor 20 builds two entries in container map 50 to reflect what it has done: entry 52 and entry 53 (FIG. 2A). Entry 52 shows that the first part of the container, A2A, is physically located on shared storage 60 with a starting location of 4500 and an ending location of 4999. Entry 53 shows that the second part of the container, A2B, is physically located on shared storage 70 with a starting location of 5000 and an ending location of 5499. Both entry 52 and entry 53 will contain the same information in fields 43 and 45, and both will contain the same key in field 44 when an allocate request is made.

Referring again to FIG. 2, assume requestor processor 30 wants to create a container 200 units in size. In addition, processor 30 wants this container to be mirrored. Requestor processor 30 sends a Create Container request to owner processor 20 over request path 120. Since requestor processor 30 wants this container to be mirrored, owner processor 20 allocates one container on shared storage 60 and a mirrored version of this container on shared storage 70. Therefore, two container entries 54 and 55 are made, as shown in FIG. 2A. Entry 54 shows that container A3 is physically located on shared storage 60 with a starting location of 2000 and an ending location of 2199. Entry 55 shows that the mirror of container A3, container A3M, is physically located on shared storage 70 with a starting location of 6000 and an ending location of 6199. Attribute field 45 in both entries 54 and 55 would indicate that mirroring was requested in the Create Container request. Note that more than one storage unit is needed in the system to realize the full complement of advantages of mirroring.

A requestor processor cannot use a container that has been created until the requestor processor has allocated the container with an Allocate Container request and has opened the container with an Open Container command.

If requestor processor 10 wants to allocate container A1, it sends an "Allocate Container" request to owner processor 20 over request path 110. Owner processor 20 first checks to see if the use count in container map entry 51 is zero, indicating that this request is the first request to allocate container A1. If so, owner processor 20 increments the use count to one and inserts a copy of container map entry 51 in container table 90 as container table entry 91. This insert operation is sent to storage controller 40 over control path 120. Storage controller 40 only accepts insert operations that come to it over control path 120, thereby guaranteeing that only owner processor 20 is able to place entries into container table 90. In response to this insert operation, storage controller 40 randomly generates a key for this container and sends this key to owner processor 20.

Owner processor 20 places the key in field 44 of container map entry 51. This insert operation is sent to storage controller 40 over control path 120. Storage controller 40 only accepts insert operations that come to it over control path 120, thereby guaranteeing that only owner processor 20 is able to place entries into container table 90. Owner processor 20 then sends the key for container A1 to requestor processor 10 over request path 110.

Note that although container sharing has been discussed, specific rules by which sharing would be permitted is a design choice not within the scope of this invention. It has been envisioned that sharing would be done for "execute" and read-only operations. It is probable that a data manager or data base manager would administer the sharing of data within a container in most instances. No assumptions are made about data integrity inside the containers which permit sharing. Those skilled in the art know there are several possible implementations which could be provided in the storage controller to facilitate container-level sharing, such as serializing operations around write operations and/or restricting write operations to a single data path.

Any time after requestor processor 10 receives the key for container A1 from owner processor 20, it sends the key along with an "Open Container" command to storage controller 40 over command path 140 in order to use the container data. If this key opens container table entry 91, storage controller 40 permits requestor processor 10 to use container A1.

When requestor processor 10 no longer desires container A1 to be opened it sends a "Close Container" command to storage controller 40 over command path 140. Note that requestor processor 10 may open and close container A1 as often as desired using the key received from owner processor 20 until the container has been deallocated, as will be described later.

Assume now that requestor processor 30 wants to allocate container A1. Owner processor sees that the use count in container map entry 51 is one, not zero, indicating that this request is not the first request to allocate container A1. Therefore, owner processor 20 does not need to insert a copy of container map entry 51 into container table 90, since this was done on the first Allocate Container request that came from requestor processor 10, as described above. Owner processor 20 simply increments the use count to two and sends the key saved in container map 50 to container A1 to requestor processor 30. Requestor processor 30 can now use this key to open container A1.

Figure 2B:
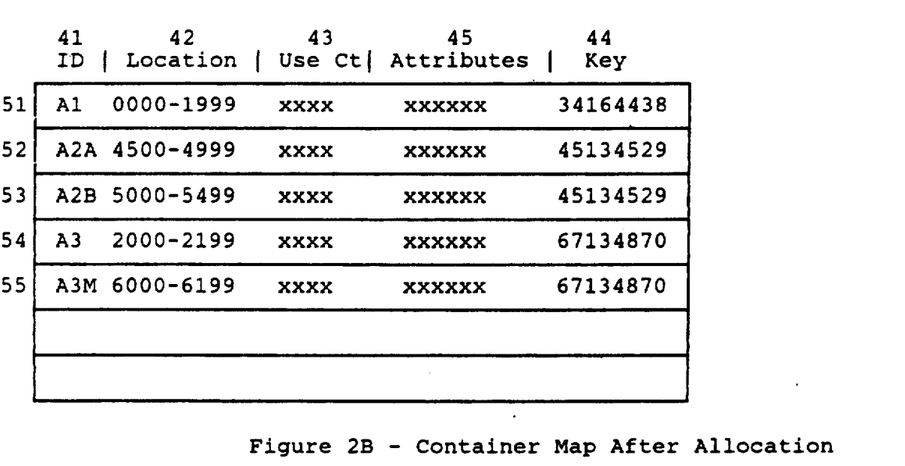

FIG. 2B shows container map 50 after containers A2 and A3 have been allocated in a manner similar to that described above with container A1. Note that entries 52 and 53 corresponding to segmented container A2 contain the same key in key field 44. Likewise, entries 54 and 55 corresponding to mirrored container A3 also contain the same key in key field 44. Therefore, when container A2 is opened by a requestor processor, the data contained in both segments A2A and A2B of container A2 is available for use by the requestor processor.

When requestor processor 30 decides that it no longer wishes to have container A1 allocated to it, it sends a "Deallocate Container" request to owner processor 20 over request path 120. Owner processor 20 sees that the use count in container map entry 51 is two, indicating that another requestor processor has allocated this container. Therefore, decrementing the use count to one is the only operation performed. If requestor processor 30 wants to use container A1 again, it must reinitiate the Allocate Container request and Open Container command, as has been discussed.

When requestor processor 10 decides that it no longer wishes to have container A1 allocated to it, it sends a "Deallocate Container" request to owner processor 20 over request path 110. Owner processor 20 sees that the use count in container map entry 51 is one, indicating that requestor processor 10 is the last requestor processor to have allocated this container. Owner processor 20 decrements the use count to zero and removes container table entry 91 in storage controller 40 corresponding to container A1. This "remove" operation is performed over control path 130. Note that like the "insert" operation discussed above, storage controller 40 will only accept remove operations over control path 130.

Figure 2C:
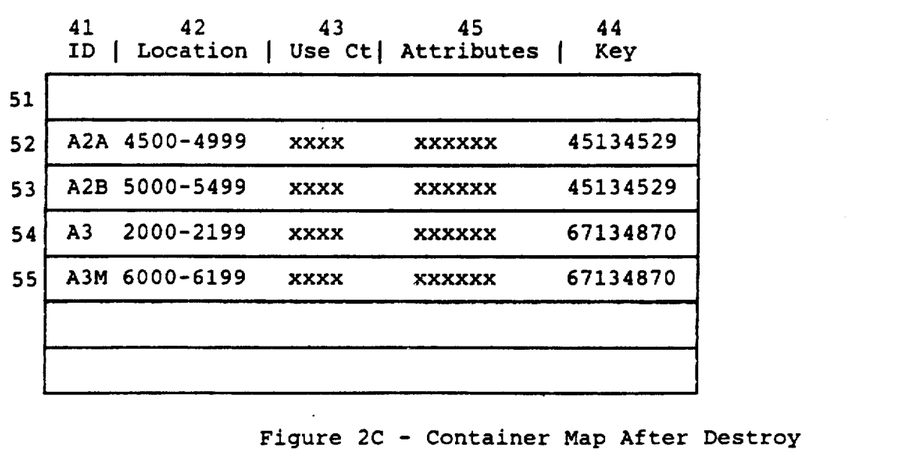

When requestor processor 10 decides that it now wants container A1 destroyed, it sends a "Destroy Container" request to owner processor 20 over request path 110. After checking to make sure that the use count in container map entry 51 is zero, indicating that the remove operation has been performed and no processor is currently using container A1, owner processor 20 erases entry 51 from container map 50. If data in attribute field 45 of entry 51 (specified during the Create Container request received from requestor processor 10) indicates that requestor processor 10 wanted the data in the container to be erased, owner processor 20 erases the data in container A1 on shared storage 60. Note that this erasure of container data can also be specified during the Destroy Container request. FIG. 2C shows container map 50 after container A1 is destroyed.

Figure 3:
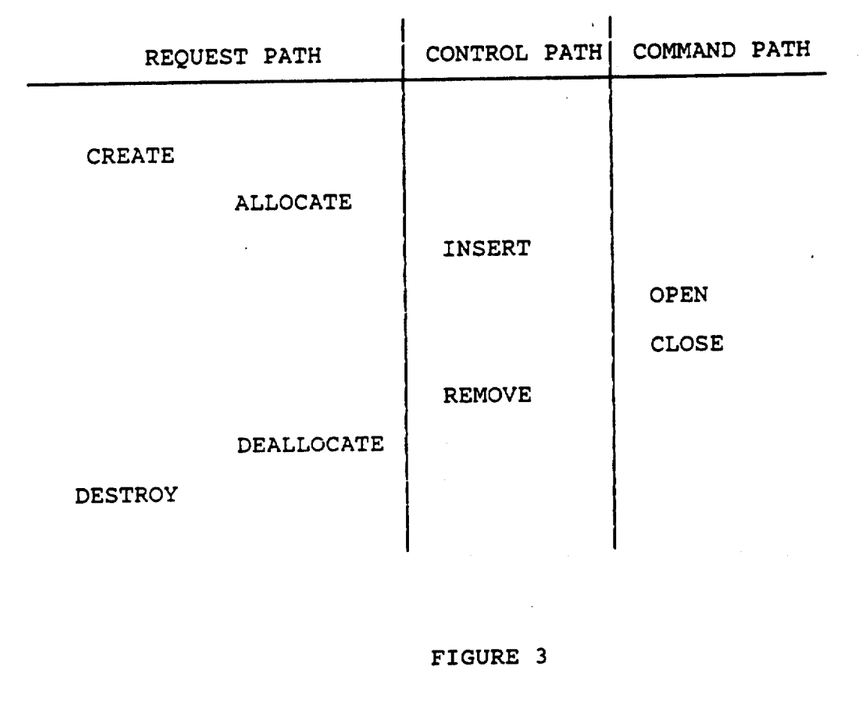
FIG. 3 shows the various requests, operations and commands of the subject invention.

FIG. 3 shows the symmetrical nature of the various requests, operations, and commands of the invention. The Create Container request is symmetrical with the Destroy Container request. The Allocate Container request is symmetrical with the Deallocate Container Request. These four requests are only valid if transmitted on a request path. The Insert Operation is symmetrical with the Remove Operation. These two operations are only valid if transmitted on the control path. Finally, the Open Container Command is symmetrical with the Close Container Command. These two operations are only valid if transmitted on a command path.

Figure 4:
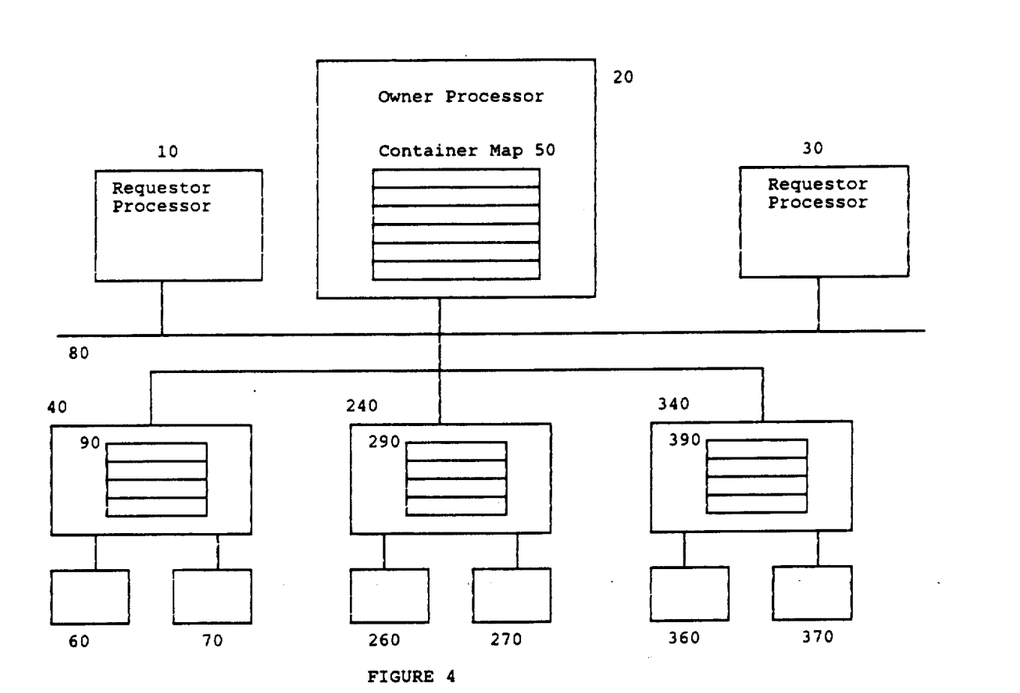
FIG. 4 shows an alternate embodiment of the invention with a plurality of storage controllers.

FIG. 4 shows an alternate embodiment where there are several storage controllers 50, 250, and 350, each controlling some shared storage. The implementation of this alternate embodiment is very similar to that of the preferred embodiment described above, except that owner processor 20 may contain some additional logic to allocate the space among each of the storage controllers. For example, each storage controller could append its address to each key it generates to ensure that each container has a unique key.

While the invention has been described with respect to preferred and alternate embodiments, it will be understood by those skilled in the art that various changes in detail may be made therein without departing from the spirit, scope and teaching of the invention. Accordingly, the herein disclosed is to be limited only as specified in the following claims.

What is claimed is:

1. A multiprocessor computer system having the ability to operate efficiently while sharing storage space in a direct access storage device, comprising:

a shared storage for storing data, comprising at least one direct access storage device, wherein said shared storage comprises a plurality of containers of data;

a communication bus for communicating between devices connected thereto;

a first storage controller connected to said shared storage and said communications bus, said storage controller further comprising a first container table, said first container table having a plurality of container table entries, wherein each said container table entry is associated with a unique container and each said entry containers a unique key for accessing said container;

an owner process connected to said communication bus, said owner processor further comprising a container map, said container map having a plurality of container map entries, wherein each said container map entry is associated with a unique container and each said entry contains a key associated with said container, wherein each said key in said container map entry associated with a respective unique container matches said unique key contained in a container table entry in said first container table associated with said respective unique container;

a first and second requestor processor connected to said communications bus, each said requestor processor comprising means for requesting a key associated with a container from said owner processor;

means in said owner processor for providing said key associated with a container from said container map in response to a request for said key from a requestor processor;

means in each said requestor processor for generating a plurality of requests for data contained in a container to said first storage controller, each said request for data contained in a container including said key associated with said container, said plurality of requests for data originating from a single request for said key associated with said container;

means in said first storage controller, responsive to a request from a requestor processor for data contained in a container, for accessing a container table entry associated with said container in said first container table;

means in said first storage controller for honoring said request if said requestor processor provides the key associated with said container, said key matching the key contained in said container table entry; and means in said first storage controller for inhibiting said requestor processor from accessing said container of data if said requestor processor does not provide said key.

2. The multiprocessor computer system of claim 1, wherein said shared storage comprises a plurality of disk drive units.

3. The multiprocessor computer system of claim 2 further comprising:

a second storage controller connected to said shared storage and said communications bus, said second storage controller further comprising a second container table, said second container table having a plurality of container table entries, wherein each said container table entry is associated with a unique container and each said entry contains a unique key for accessing said container;

a plurality of additional disk drive units connected to said second storage controller;

means in each said requestor processor for generating a plurality of requests for data contained in a container to said second storage controller, each said request for data contained in a container including said key associated with said container, said plurality of requests for data originating from a single request for said key associated with said container;

means in said second storage controller, responsive to a request from a requestor processor for data contained in a container, for accessing a container table entry associated with said container in said second container table;

means in said second storage controller for honoring said request if said requestor processor provides the key associated with said container, said key matching the key contained in said container table entry; and means in said second storage controller for inhibiting said requestor processor from accessing said container of data if said requestor processor does not provide said key.

4. The multiprocessor computer system of claim 2 wherein a first part of said container of data resides on one disk drive unit and a second part of said container of data resides on a different disk drive unit.

5. The multiprocessor computer system of claim 2 wherein said container of data resides on one disk drive unit and a mirrored copy of said container of data resides on a different disk drive unit.

6. The multiprocessor computer system of claim 1 wherein said key is a random string of data.

7. The multiprocessor computer system of claim 1 wherein each of said container map entries further comprises:
   a location field for storing the location of said container on said shared storage.

8. The multiprocessor computer system of claim 1 wherein each of said container map entries further comprises:
   a use count field for storing the number of requestor processors that have allocated said container.

9. The multiprocessor computer system of claim 1 wherein each of said container map entries further comprises:
   an attribute field for storing container attributes.

10. The multiprocessor computer system of claim 1 wherein each of said container table entries is substantially a copy of a corresponding container map entry.

11. A shared storage apparatus for a multiprocessor computer system, said system having a plurality of requestor processors each capable of generating requests to allocate data storage, to deallocate data storage, and to access data contained in data storage, said computer system comprising:
   a shared storage space for storing data, comprising at least one direct access storage device;
   a communications bus for communicating between devices connected thereto;
   a storage controller connected to said shared storage and said communications bus;
   an owner processor connected to said communications bus;
   means in said owner processor for allocating a plurality of containers of data in said shared storage, each allocation of a container being in response to a respective request from a requestor processor to allocate data storage;
   means in said owner processor for storing a plurality of unique keys, each said unique key being associated with a respective unique container of data;
   means in said storage controller for storing a plurality of unique keys, each said unique key stored in said storage controller being associated with a respective unique container of data, wherein each said key stored in said storage controller associated with a respective unique container of data matches said unique key in said owner processor associated with said respective unique container of data;
   means in said owner processor for providing said key associated with a container in response to a request for said key from a requestor processor;
   means in said storage controller, responsive to a request from a requestor processor to access data contained in a container, for honoring said request from a requestor processor to access data contained in a container if said requestor processor provides the key associated with said container;
   means in said storage controller, responsive to a request from a requestor processor to access data contained in a container, for inhibiting said requestor processor from accessing said data contained in a container if said requestor processor does not provide said key associated with said container;
   means in said owner processor for receiving a request from a requestor processor to deallocate a container;
   means in said owner processor for determining, with respect to a container, the requestor processors to which said container has been allocated; and
   means in said owner processor, responsive to said means for receiving a request from a requestor processor to deallocate a container and responsive to said means for determining the requestor processors to which a container has been allocated, for deallocating a container of data only when said means for determining the requestor processors to which said container has been allocated determines that all requestor processors to which said container has been allocated have requested deallocation of said container.

12. The shared storage apparatus of claim 11, wherein said shared storage space comprises a plurality of disk drive units.

13. The shared storage apparatus of claim 11, wherein:
   said means in said owner processor for storing a key comprises a container map, said container map having a plurality of container map entries, where each said container map entry is associated with a unique container and each said entry contains said key associated with said container; and
   said means in said storage controller for storing said key comprises a container table, said container table having a plurality of container table entries, wherein each said container table entry is associated with a unique container and each said entry contains said key for accessing said container;

14. The shared storage apparatus of claim 13 wherein each of said container map entries further comprises a use count field for storing the number of requestor processors to which the container associated with said respective container map entry has been allocated, and wherein said means for determining, with respect to a container, the requestor processors to which said container has been allocated comprises means for incrementing said use count field when the container associated with said respective container map entry is allocated to a requestor, and means for decrementing said use count field when a request to deallocate said container is received from a requestor.

* * * * *